(12) United States Patent
Chang et al.

(10) Patent No.: US 6,514,589 B1
(45) Date of Patent: Feb. 4, 2003

(54) SOLAR CONTROL FILM

(75) Inventors: Won Suk Chang, Sungnam (KR); Jong Min Park, Anyang (KR); Chang Sup Ji, Suwon (KR)

(73) Assignee: Kolon Industries, Inc., Kyunggi-do (KR)

( * ) Notice: Subject to any disclaimer, the term of this patent is extended or adjusted under 35 U.S.C. 154(b) by 56 days.

(21) Appl. No.: 09/637,907

(22) Filed: Aug. 14, 2000

(30) Foreign Application Priority Data

Jan. 10, 2000 (KR) .............................................. 00-846

(51) Int. Cl.$^7$ ................................................ G02B 5/32
(52) U.S. Cl. .................... 428/41.7; 235/457; 283/86; 359/1; 359/32; 428/40.1; 428/40.9; 428/41.1; 428/41.3; 428/41.5; 428/41.8; 428/42.1; 428/141; 428/142; 428/172
(58) Field of Search ............................ 428/40.1, 40.9, 428/41.1, 41.3, 41.5, 41.7, 41.8, 42.1, 141, 142, 172; 283/86; 235/457; 359/32, 1

(56) References Cited

U.S. PATENT DOCUMENTS

| | | | |
|---|---|---|---|
| 4,095,013 A | 6/1978 | Burger | 428/522 |
| 4,157,417 A | 6/1979 | Murphy | 428/344 |
| 4,645,714 A | 2/1987 | Roche et al. | 428/458 |
| 4,856,857 A | * 8/1989 | Takeuchi | 283/72 |
| 5,486,933 A | * 1/1996 | Shindo | 359/2 |

* cited by examiner

*Primary Examiner*—Nasser Ahmad
(74) *Attorney, Agent, or Firm*—Shanks & Herbert

(57) ABSTRACT

This invention relates to a solar control film that blocks the sunlight, when applied to various windows of automobiles, buildings or exhibition places and that prevent any second accident caused by broken glasses at an accident. From the solar control film, a surface protective layer, a plastic film substrate, a hologram-engraved layer, a metal deposition layer, a pressure sensitive adhesive layer and a release film are laminated in due order. The solar control film of this. Hence the above-described solar film has a basic function such as an excellent blocking rate of visible and infrared rays, while demonstrating an additional antifog action and an elegant look due to the hologram effect.

3 Claims, 1 Drawing Sheet

SOLAR CONTROL FILM

This application claims priority to Republic of Korea Patent Application 2000-846, filed Jan. 10, 2000.

FIELD OF THE INVENTION

This invention relates to a solar control film that blocks the sunlight, when applied to various windows of automobiles, buildings or exhibition places and that prevent any second accident caused by broken glasses at an accident, and more particularly, to the solar control film, wherein an antifog layer is applied, while a hologram is also applied in whole or in part for an elegant look.

DESCRIPTION OF THE RELATED ART

Recently, a solar control film has been widely used for various purposes as follows: (1) energy conservation through the enhancement of the air-conditioning and heating efficiency, (2) natural disasters (e.g. earthquake), prevention of broken glasses in a car accident from being scattered, (3) prevention of discoloration of furniture and decorations inside the buildings, (4) protection of individual privacy, and (5) elegant look.

However, the conventional solar control film is only designed to simply demonstrate one color, which is prepared by the following procedure: a solvent-type dye for the development of color is added to a pressure sensitive adhesive layer which is coated on a plastic film substrate, or when a metal deposit layer is intended to be newly formed, a pressure sensitive adhesive layer is provided on top of the metal deposit layer in a plastic layer.

Further, the convention art has recognized some disadvantages in that since its surface protective layer serves to protect a simple protective layer, the actual function is less useful and the fogging phenomenon in the automobiles and buildings on rainy days results in preventing the proper driving or poor vision from the buildings.

The outlined structure is shown in FIG. 1. The conventional solar control film as shown in FIG. 1 is formed in such a manner that a surface protective layer 1, a polyethylene terephthalate film 2, a metal deposit layer 4, a pressure sensitive adhesive layer 5, and a release film 6 are laminated in due order.

SUMMARY OF THE INVENTION

Under such circumstances, the inventors et al. have conducted intensive studies to improve the simplicity of the color and the simple function of the protective layer that the conventional solar control film has encountered and thus, a novel solar control film can be prepared in such a manner that with a hologram-engraved layer in a coloring layer and proper control of metal deposition layer in terms of site and thickness, various patters can be produced and a variety of beautiful appearances can be also realized depending on the colors and direction of sunlight, while having an antifog action at the surface protective layer.

Therefore, an object of this invention is to provide a solar control film with a hologram pattern which can demonstrate the elegant looks, differentiating from the conventional one-color solar control film, while having an antifog action at the surface protective layer.

To accomplish the above object, the solar control film of this invention is characterized by a structure, wherein a surface protective layer with an antifog action, a plastic film substrate, a hologram layer, a metal deposit layer, a coloring pressure sensitive adhesive layer, and a release film are laminated in due order.

DETAILED DESCRIPTION OF THE INVENTION

Figure 1:
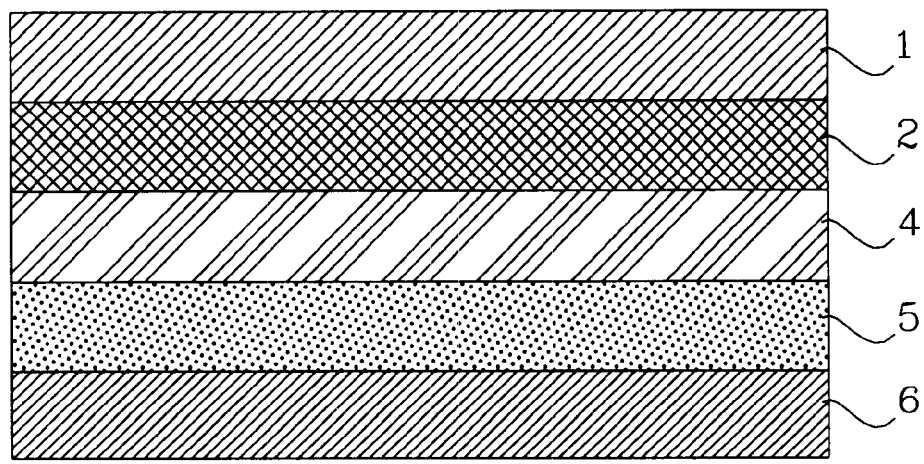
FIG. 1 is a cross-sectional view showing the structure of a general solar control film.
Figure 2:
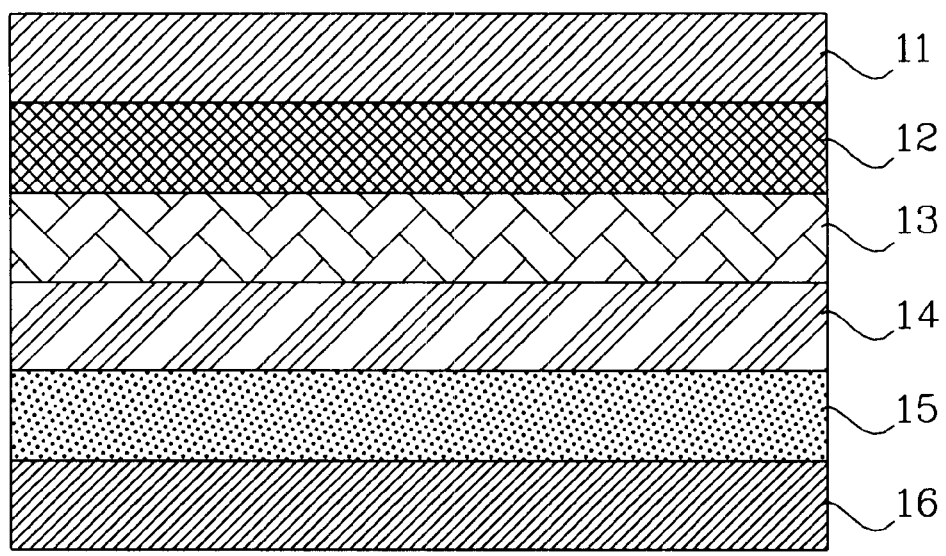
FIG. 2 is a cross-sectional view showing the structure of a general solar control film according to this invention.

The schematic cross-sectional view of a solar control film according to this invention is shown in FIG. 2.

(1) Hologram-engraved Layer

The general method for engraving a hologram pattern is performed by the following two methods: (1) a method to directly engrave a hologram pattern into a plastic film substrate, and (2) a method to directly engrave a hologram pattern into a resin layer designed to be coated engraved into the plastic film substrate.

In general, a casted polypropylene (CPP) is employed as a plastic film substrate of a solar control film so as to engrave a hologram pattern into a film itself utilizing the soft nature of such film.

However, due to the soft nature of CPP and basic polypropylene properties, the surface protective layer of film cannot be coated with CPP.

This invention is intended to comply with this matter using a transparent polyethylene terephthalate film with better measurement stability and coating property.

However, since the polyethylene terephthalate film itself is not engraved due to its nature of hardness, a transparent resin coating layer is placed on the film so as to engrave the resin coating layer, thus obtaining a hologram pattern (hologram-engraved layer 13).

According to this invention, the resin layer of hologram-engraved layer comprises a nitrocellulose resin having a better film formation and heat resistance and an acrylate resin having a soft and easily hardening nature, whereby a coating layer with a semi-permanent hologram pattern can be obtained.

The hologram-engraved resin layer of this invention designed for a hologram pattern refers to a resin coating layer in which the hologram engraving is easily made available and the pattern can be semi-permanently maintained after engraving.

The hologram-engraved resin layer designed for a hologram pattern comprises an acrylate resin and a nitrocellulose resin and its appropriate viscosity ranges from ¼ second to 1/20 seconds. Further, the examples of the hardeners used for this invention include melamine formaldehyde, urea formaldehyde, polyisocynate, degenerated polyisocynate, polyaziridine, zirconium complex, epoxy, zinc oxide and magnesium oxide; among them, polyisocynate is appropriate as a hardener. In case where the above two resins are employed in the absence of a hardener, the engraving for a hologram pattern becomes poor due to heat generated during the engraving process and this poor engraving may also occur during deposition.

In this connection, the hologram-engraved resin layer should comprise three components such as a nitrocellulose resin, an acrylate resin and a polyisocyanate resin.

It is preferred that the amount of nitrocellulose/acrylate resins is in the range of 1/0.2~5 wt. %. If the above composition ratio is less than 1/0.2, the engraving process for hologram pattern cannot be easily made available due to the strongly hardened film and during the engraving process, the film may be destroyed. By contrast, if the above composition ratio exceeds 1/5, the engraving process for hologram pattern is well performed thanks to the extremely smooth film but such extremely smooth film makes the engraved pattern squashing. It is preferred that the amount of nitrocellulose/hardener is in the range of 1/0.5~5 wt %. If the amount of hardener is less than 0.5, the insufficient hardening may weaken the Adhesion strength of fragment to the film, thus resulting in its detachment from the film. By contrast, in case of exceeding 1/5, the fragment may be easily brittle due to the excessive hardening.

Further, to demonstrate the characteristics of fragment, its coating thickness is important. It is preferred that the coating thickness is in the range of 0.2~10 $\mu$m, more preferably in the range of 0.5~5 $\mu$m. If the coating thickness is less than 0.5 $\mu$m, the engraving pattern is not distinct due to an insufficient engraving. By contrast, if the coating thickness exceeds 5 $\mu$m, the fragment, which is constricted after engraving and detached voluntarily from a film, may be easily brittle. To maximize the characteristics of fragment, it is important that the continuous-phase film should be formed.

(2) Metal Deposition Layer

After a hologram pattern is engraved in the whole of such hologram-engraved resin layer, the metal deposition layer 14 is deposited. By controlling the deposition site of metal deposition layer and the thickness of metal deposition layer, the metal deposition layer is deposited in the whole or certain site, thus obtaining a hologram solar control film with various decorations and patterns. Further, the metal deposition is performed to ensure the whole or partial hologram hologram effect.

When the metal deposition layer is deposited in the whole site of film, the thickness of metal deposition layer is in the range of 20~180 Å but in the case where a partial hologram effect is intended to be obtained in some part with a certain width, the thickness of metal deposition layer is in the range of 130~500 Å.

When the metal deposition layer is deposited in some part, it is preferred that the metal deposition layer is deposited by less than 70% to the whole width of plastic substrate film.

By taking advantage of reflection properties of metal, the metal deposition layer is deposited with aluminum (purity: 99.99%) under a very high vacuum atmosphere of $2 \times 10^{-5}$ torr by a resistance heat method, thus reflecting the heat rays with a proper control of visible-ray transmissibility.

(3) Surface Protective Layer Having Antifog Action

According to this invention, an antifog agent is contained in the surface protective layer 11 in an effor to provide an antifog action to the surface protective layer.

The antifog agent contained in the surface protective layer may select a commonly available surfactant such as a nonionic surfactant or a cationic surfactant.

The antifog agent is mixed with a surface-protective material. According to this invention, the amount of antifog agent is contained in the range of 5~80 wt. parts to the surface-protective material, preferably in the range of 10~70 wt. parts. If the amount of antifog agent is less than 10 wt. parts, any antifog effect cannot be expected but in case of exceeding 70 wt. parts, the surface-protective function cannot be ensured due to a lower surface strength.

The surface protective layer serves to provide an abrasion resistance to a substrate film and the thickness of its hard film is in the range of 0.1~5 $\mu$m. The chemical composition of the surface protective layer designed to provide an antifog capacity includes a photo-hardening oligomer, a photo-initiator and diluent. The hardened film with better abrasion resistance is prepared in such a manner that the surface protective layer is applied to a support film, pre-dried, followed by the photo-hardening process with UV rays. According to this invention, the examples of suitable photo-hardening oligomers include urethane acrylate, urethane methacrylate, epoxy acrylate, epoxy Novolak acrylate, polyester acrylate, polybutadiene diacrylate and polyester urethane acrylate. The example of suitable photo-initiators include benzyldimethylketal, benzoinbutylether, trimethylbenzophenone, $\alpha$-hydroxyketone, ethyl 4-(dimethylamino)benzoate, benzophenone, and hydroxylalkylacetophenone.

To maximize the effect of this invention, it is important that continuous-phase, thin-coated films should be formed.

(4) Plastic Film Substrate

A transparent or dyeing film with the thickness of 10~100 $\mu$m is appropriate as the plastic film substrate 12 of this invention, polyethylene terephthalate bi-axial elongation film. In the case of a transparent film, it is colored in a pressure sensitive layer using a dye to control the amount of sunlight.

(5) Pressure Sensitive Adhesive Layer

According to this invention, the chemical composition of a pressure sensitive adhesive layer 15 includes an acrylate resin, a hardener, an UV absorber, a dye, a stickyness modulator and a solvent. The appropriate examples of acrylate resin used for this invention include a single polymer selected from the group consisting of the following compounds: methylmethacrylate, ethylmethacrylate, isobutylmethacrylate, normal butylmethylmethacrylate, acrylic acid, metacrylic acid, itaconic acid, hydroxyethylmethacrylate, hydroxypropylmethacrylate, hydroxyethylacrylate, acrylamide, methylol acrylamide, glycidylmethacrylate, ethylacrylate, isobutyl acrylate, normal butylacrylate, 2-ethylhexyl acrylate; or, copolymer; or, terpolymer. Further, to maximize the effect of this invention, it is recommended to use a hardner so as to improve the moisture resistance of a pressure sensitive adhesive layer. The examples of the hardeners recommended by this invention include melamine formaldehyde, urea formaldehyde, polyisocyanate, polyaziridine, zirconium complex, epoxy, zinc oxide, and magnesium oxide.

From the chemical composition of the pressure sensitive adhesive layer, an UV absorber serves to block at a region of 300~400 nm wavelength from the sunlight so as to prevent any discoloration of film. The examples of the UV absorbers include 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2-hydroxy-4-normal octoxybenzophenone, 2-hydroxy-5-t-octylphenyl benzotriazole. The examples of commercially available UV absorbers include CYASORB UV9, UV24, UV207, UV284, UV531, UV2300, UV5411 (Cyanamid Co.) and CHIMASSORB 81, 90, TINUVINP 328, 900, 292, 622, 765, 770, 144 (Ciba-Geigy Co.).

Further, according to this invention, the chemical composition of the pressure sensitive adhesive layer comprises 100 wt. parts of acrylate resin, 5 wt. parts of hardener, 1 wt. part of UV absorber, a suitable amount of dye and solvent. The metal deposition layer is coated with the the pressure sensitive adhesive layer and dried.

As such, the solar control film of this invention laminating a surface protective layer 11, a plastic film substrate 12, a hologram-engraved layer 13, a metal deposition layer 14, a pressure sensitive adhesive layer 15 and a release film 16 in due order, is prepared in the following steps:

first, a surface protective layer coating composition having the antifog action is applied to one side of a plastic film substrate, dried by a heat-convection oven and hardened by UV rays;

on another film, a hologram-engraved resin layer coating composition is applied to the plastic film substrate and engraved to form a hologram-engraved layer;

under a very high vacuum state, one side of film coated with the hologram-engraved resin layer coating composition is vacuum-deposited using aluminum;

one side of the vacuum-deposited film is coated with a pressure sensitive adhesive layer coating composition, dried and additionally may be laminated together with the surface protective layer;

an additional pressure sensitive adhesion layer may be coated thereon; and finally, a release film is laminated for ageing.

This invention is explained in more detail based on the following examples but is not limited by these examples, since the following examples are provided for an easier understanding of this invention.

EMBODIMENTS 1~4

Based on the chemical composition shown in the following table 1, a surface protective layer coating composition having the antifog action was applied to one side of a bi-axial elongation plastic film substrate with the thickness of 25 $\mu$m using Meyer bar, dried by a heat-convection oven at 80° C. for 10 minutes and treated by an UV hardening device (Fusion Co.: of U.S.A.) at radiation distance (5 cm) and feed rate (5 m/min). Then, based on the chemical composition shown in the following table 1, a hologram-engraved resin layer coating composition was applied to the plastic film substrate, dried at 130° C. for 2 minutes and engraved to form a hologram-engraved layer. Under a very high vacuum state of 5×10$^{-6}$ torr, one side of various-thickness film coated with the hologram-engraved resin layer coating composition was vacuum-deposited using aluminum (purity: 99.99%). One side of the vacuum-deposited film was further coated with a pressure sensitive adhesive layer coating composition so as to have the thickness of 10 $\mu$m and dried. After that, the surface protective layer is laminated therewith, and a pressure sensitive adhesion layer is coated thereon. Finally, a release film was laminated and aged for at 50° C. for 7 days.

TABLE 1

| Category | Ingredient | Example 1 | Example 2 | Example 3 | Example 4 |
|---|---|---|---|---|---|
| Hologram-engraved resin coating layer | Nitro cellulose (1/16)[1] | 10 | 7 | 7 | 10 |
| | Acrylate resin[2] | 10 | 14 | 35 | 5 |
| | Polyisocyanate[2] | 10 | 10 | 10 | 10 |
| | SAVINYL BROWN[3] | 0.1 | 0.1 | 0.1 | 0.1 |
| | Methylethyl ketone | 40 | 40 | 40 | 40 |
| | Toluene | 40 | 40 | 40 | 40 |
| Vacuum-deposited film | Coating thickness ($\mu$m) | 3 | 3 | 3 | 3 |
| | Site of metal deposition layer | Whole | Whole | Whole | Center* |
| | Metal deposition thickness Å | 20 | 100 | 150 | 130 |
| Surface-protective layer | Urethane acrylate | 50 | | | |
| | Benzyldimethylketal | 4 | | | |
| | Methlethylketone | 10 | | | |
| | Ethylacetate | 10 | | | |
| | Antifog agent | 5 | 15 | 20 | 25 |
| Pressure sensitive adhesive layer | Acrylate terpolymer[4] | 100 | | | |
| | Polyisocyanate | 5 | | | |
| | Tinubin 292[5] | 1 | | | |
| | Methylethylketone | 20 | | | |
| | Ethylacetate | 30 | | | |

(Note)
[1]Daesang Chem. (nitrocellulose resin)
[2]Aekyung Chem.
[3]Useful dye (Clarient Co.)
[4]2-ethylhexylacrylate/methylmethacrylate/acrylic acid terpolymer
[5]UV-ray absorbant (CIBA-GEIGY Co.)
*40 percent was deposited at the center site to the whole site of film.

Each of the solar control films, so prepared from Examples 1~4 was evaluated by the following method and their results were shown in the following table 2.

Evaluation Method

<Degrees of Hologram Pattern Effect in a Hologram-engraved Layer>

From the solar control film, a hologram-engraved coating layer was macroscopically measured under an incandescent electric light and its results were shown as follow:

⊚ (very good), ○ (good), Δ (slightly weak), × (very weak)

<Degrees of Hologram Depending on Deposition Sites>

1) Whole deposition of hologram: ⊚ (very good), ○ (good), Δ (slightly weak), × (very weak)
2) Partial deposition of hologram: ⊚ (very good), ○ (good), Δ (slightly weak), × (very weak)

<Adhesion Strength>

After a release film was detached, a solar control film specimen having 1 inch of width and 15 cm of length was placed in a glass plate where water was homogeneously sprayed, compressed, dried and left for 24 hours to measure its Adhesion strength at the tensile rate of 50 mm/min using Instrong tester.

<Transmittance of Visible Rays>

After a release film was detached, the transmittance of visible rays was measured using a whole-ray transmissibility measurement device (NihonDenshoku Co., Ltd.; model No. NDH-100DP).

<UV-cut Efficiency>

After a release film was detached, the UV-cut efficiency was measured using a spectrophotometer for UV and visible rays (Shimadzu Co.; model No. UV-260) at 360 nm.

<Hardness of Film>

SS: very strong, S: slightly strong, M: slightly weak, MM: weak

<Antifog Effect>

⊚ (very good), ○ (good), Δ (slightly weak), × (very weak)

<Abrasion Resistance>

After a protective layer film was rubbed with Steel wool No. 0000, a release film was detached to measure the haze of the specimen using a whole-ray transmittance measurement device.

TABLE 2

| Testing item | Example 1 | Example 2 | Example 3 | Example 4 |
|---|---|---|---|---|
| Degrees of hologram pattern | | | | |
| Wholly deposited hologram | ⊚ | ⊚ | ⊚ | ⊚ |
| Partially deposited hologram | ⊚ | ⊚ | ⊚ | ⊚ |
| | | | | ⊚ |
| Adhesion strength (g/inch) | 500 | 500 | 500 | 500 |
| Transmittance of visible rays (%) | 55 | 45 | 30 | 30 |
| Blocking rate of UV rays (%) | 98 | 98 | 98 | 98 |
| Film hardness | M | M | M | M |
| Antifog effect | ⊚ | ⊚ | ⊚ | ⊚ |
| Abrasion resistance (%) | 4 | 4.2 | 4.5 | 5.5 |

As mentioned above, the solar control film of this invention is useful in blocking the sunlight, when applied to various windows of automobiles, buildings or exhibition places and that prevent any second accident caused by broken glasses at an accident, since its basic blocking action against UV and visible rays is excellent with the additional antifog action, together with an elegant appearance due to a hologram effect.

What is claimed is:

1. A solar control film comprising:

a surface protective layer comprising 100 parts by weight of a surface protective agent and from 5 to about 80 parts by weight of an antifog agent;

a plastic film substrate;

a first pressure sensitive adhesive layer;

a hologram-engraved layer comprising a nitrocellulose resin, an acrylate resin and a polyisocyanate resin wherein the weight ratio of the nitrocellulose resin to the polyisocyanate resin is in the range from 1:0.2 to about 1:5 and the weight ratio of the nitrocellulose resin to the polyisocyanate is in the range from 1:0.5 to about 1:5;

a metal deposition layer;

a second pressure sensitive adhesive layer; and a release film, wherein the layers are laminated in due order.

2. The solar control film of claim 1, wherein said metal deposition layer is formed on the whole of or on a portion of, the solar control film.

3. The solar control film of claim 1, wherein the thickness of said hologram-engraved layer is in the range from 0.5 μm to about 5 μm.

* * * * *